Figure 1:
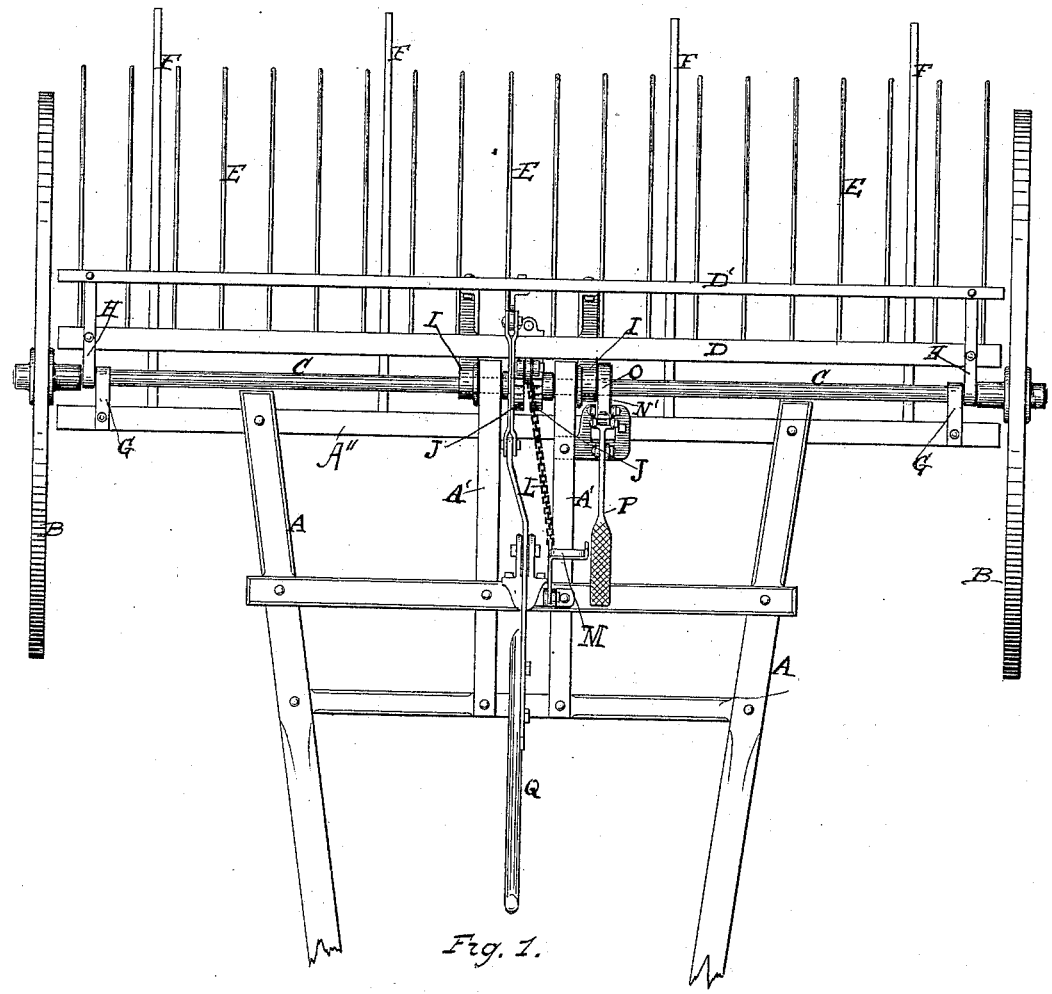

(No Model.) 2 Sheets—Sheet 1.

W. J. RISEDORPH.
HORSE HAY RAKE.

No. 418,342. Patented Dec. 31, 1889.

Witnesses.
Henry Lehlinghoff.
William F. Selkirk.

William J. Risedorph.
Inventor.
by his attorney
Alex. Selkirk.

(No Model.) 2 Sheets—Sheet 2.
W. J. RISEDORPH.
HORSE HAY RAKE.
No. 418,342. Patented Dec. 31, 1889.
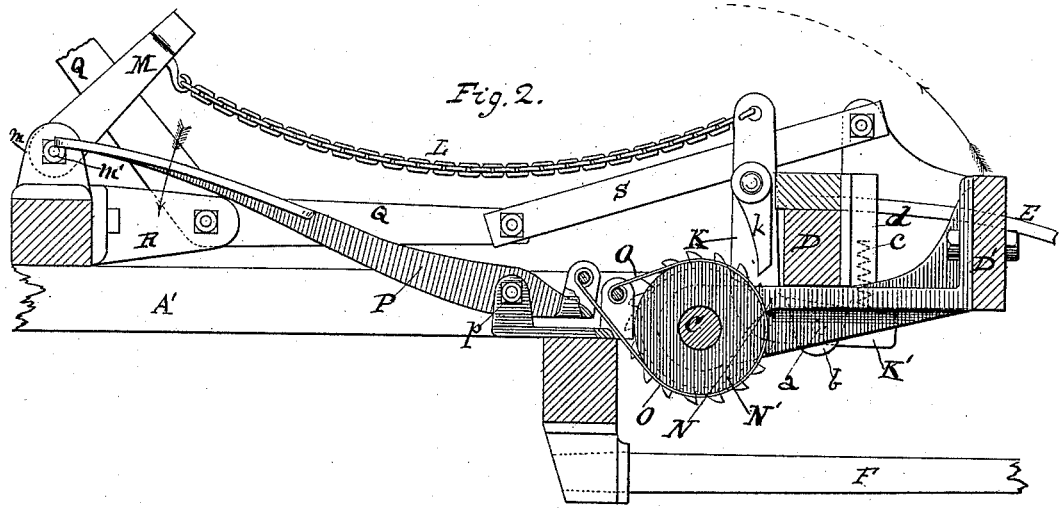
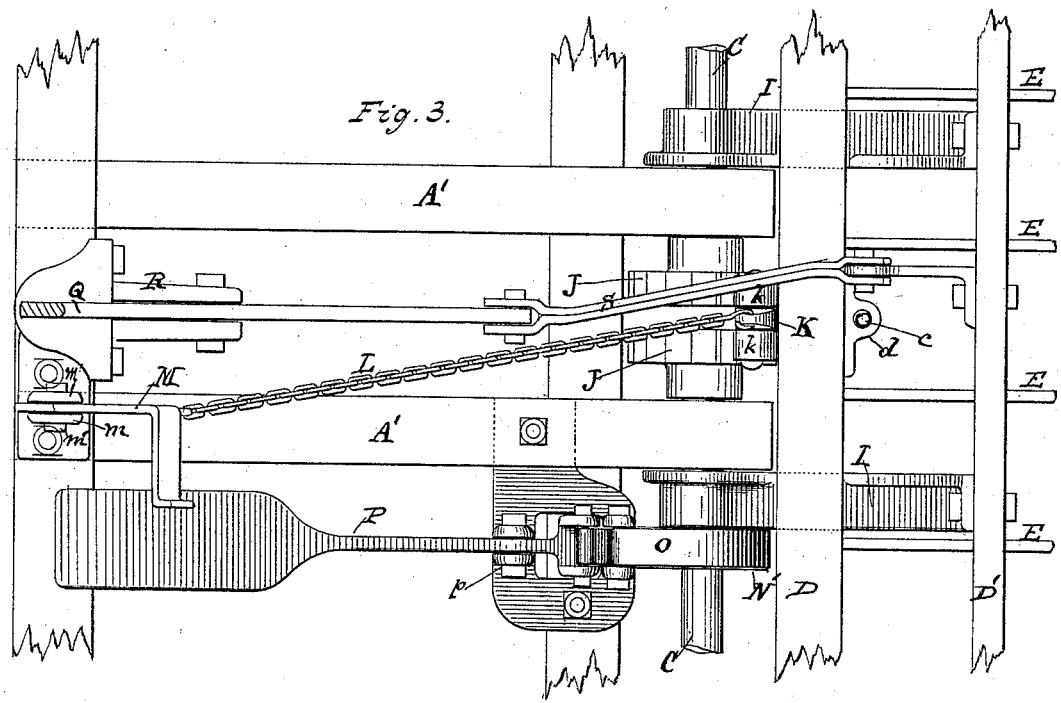
Witnesses.
Henry Schlinghoff.
William F. Selkirk.
William J. Risedorph.
Inventor.
by his Attorney
Alex. Selkirk

UNITED STATES PATENT OFFICE.

WILLIAM J. RISEDORPH, OF ALBANY, NEW YORK.

HORSE HAY-RAKE.

SPECIFICATION forming part of Letters Patent No. 418,342, dated December 31, 1889.

Application filed March 12, 1889. Serial No. 303,034. (No model.)

*To all whom it may concern:*

Be it known that I, WILLIAM J. RISEDORPH, a citizen of the United States, residing at Albany, in the county of Albany and State of New York, have invented certain new and useful Improvements in Horse Hay-Rakes, of which the following is a specification.

My invention relates to improvements in horse hay-rakes of the class known as "draft dump-rakes;" and it consists in the devices and parts and combinations of devices and parts hereinafter particularly described, and specifically set forth in the claims.

The objects of my invention are, first, to combine with the revolving axle or half-axles of the horse hay-rake a friction-wheel made with or secured to the bracket connected with the rake-head, and a friction-strap and lever operated at will by the driver, whereby the rake-head, when lifted by the lifting mechanism operated by the animal, can be held up or gradually allowed to drop or have the teeth of the said head held down to the ground and against the lifting force of the gathered hay. It consists, secondly, in the combination, with the revolving axle or half-axles and the rake-head and the ratchet-wheel and pawl for throwing the head in locking engagement with said axle, whereby the horse will be made to lift the rake-head, of a friction device made with or secured to a bracket attached to the rake-head, and a friction-strap connected with the rake-frame and a lever pivoted thereto, whereby the rake head will be under the control of the operator for effecting a dump of the rake by the draft of the horse or the holding down of the teeth, as may be required, and, lastly, to combine certain elements, devices, or parts to produce a specific construction by which this invention may be embodied in the horse-rake.

I attain these objects by the means illustrated in the accompanying drawings, forming a part of this specification, in which—

Figure 1 represents a plan view of the horse hay-rake embodying the features of this invention. Fig. 2 is a sectional elevation, on an enlarged scale, of the operating parts of the rake, by which at the will of the driver the animal will dump the rake and hold the teeth of the same up from the ground, as may be required. Fig. 3 is a view from above of the same.

The same letters of reference refer to like parts throughout the several views.

In the drawings, A represents the shafts of the draft-frame. B B are the carrying-wheels. C C are half-axles secured with wheels B B, so as to revolve with the same. D and D' constitute the rake-head, with the piece D for holding the head ends of the teeth E, and the piece D' for operation as a lifting and pressing bar, by which the teeth will be lifted or pressed down upon the ground. F F are clearer-bars secured to the cross-bar of the draft-frame. The draft-frame is hinged to the axles C C by means of the eyes G G and holes (indicated by dotted lines in Fig. 1) made in the rear ends of the bars A' of the draft-frame, as shown in Figs. 1 and 3. The rake-head D D' is also hinged to axles C C by means of straps H H and brackets I I, as shows in the same figures. These parts of the rake are so well known that they require no particular description.

Secured to the inner ends of axles C C are ratchet-wheels J J, and pivoted to the rake-head D D' is the bell-crank lever K K', to which is pivoted the pawls *k k*, as shown in Figs. 2 and 3. This bell-crank lever K K' is pivoted to the rake-head D D' by means of pivot *a* through its limb K' and ear *b*, secured to the part D of said rake-head. A reacting-spring *c* (preferably a coiled-wire spring) is contained within a suitable piece, as *d*, (secured to the piece D of the rake-head,) and operates with the limb K' of the lever K K' to hold it in position, as shown in Fig. 2.

L is a chain or other suitable connection between lever M and the upper end of limb K of the crank-lever. A lever M is pivoted to the draft-frame by means of ears *m* and pivot *m'*, as shown in the several figures.

N is a bracket made in connection with one of the two brackets I or secured to the same, and has made solid with it or has rigidly secured thereto the friction-disk N'. This bracket and its connected or attached friction-disk are both similarly perforated to loosely receive one of the shafts C, so that it can freely revolve in the same.

O is a friction-strap, having one end secured to the frame A, or a fixed part thereof, with its body around the friction-wheel N' and its opposite end pivoted to the short end of lever P. This lever P is pivoted to the frame A by suitable pivoting connection $p$, as shown in the drawings.

Q is a hand-lever connected with bracket R and secured to the rake-head by suitable connecting-link S. This hand-lever is under the control of the operator for raising and lowering the rake-head at will without aid of the horse.

The manner in which the several parts of this horse hay-rake operates is as follows: When by the draft of the horse the rake is drawn over the field, the wheels B B will revolve the axles C C secured to them, and the ratchet-wheels J J, secured to the inner ends of these axles, will run free from the pawls $k\,k$, and the teeth E E will have their points or gathering ends running on the ground, as is common with curved teeth E E. The driver, with his foot on lever P, will tighten the friction-strap O of the friction-wheel N', when the teeth E E will, through the rake-head D D' and bracket, be locked down to the ground and against any lifting tendency of the hay while it is being gathered against the teeth. When the rake has gathered a sufficient amount of hay, the operator will place his foot on chain L or against lever M and force the bell-crank lever K forward, so as to carry the pawls $k\,k$ in engagement with the teeth of the ratchet-wheels J J, when the rake-head will be locked with the axle or axles C C. The draft of the horse being continued, the axle or axles C C will continue to revolve, and by reason of the pawl $k$ being locked with the ratchet-wheels J the rake-head D D', with its teeth E, will be lifted to a height sufficient for discharging the load of gathered hay. While discharging the hay the driver, having his foot on lever P, will press upon the same to tighten the friction-strap O sufficiently upon the friction-pulley N to hold the rake-head lifted until the animal has drawn the rake over the ground of the windrow, when, easing his pressure on said lever P, he will allow the rake-head to drop more or less slowly (according to the speed of the animal) until the rake-teeth are brought again to the ground, when, with a suitable amount of pressing force on said lever P, he will hold the rake-teeth to the ground and against the gathered hay until the rake is filled for dumping, when, by operation with chain L or lever M, he will again bring the pawl $k$ in engagement with the ratchet-wheels, and thereby cause the revolving axles to dump the load, as above. These operations, substantially as above described, will be repeated as the work of raking the field is continued.

Although the drawings show a divided axle or two short axles employed with my improvements, yet it is obvious that a single axle having ratchet-wheels attached and working in carrying-wheels B and holding with the same by suitable ratchet-wheels with the hubs of said carrying-wheel may be employed, and that by the use of bracket N, with its connected friction-wheel N', and strap O, with the lever P and single revolving axle, can at will be locked with the rake-head, so that the operator can at will cause the revolving axle to hold the rake-head with the teeth up, or allow the same to be slowly lowered, or forcibly hold the same down, so that the teeth will be held down to the surface of the ground, as can be had with the divided axle as above described.

These improvements are so simple in their nature as to be cheaply constructed and not liable to get out of order, and they enable the driver to have complete control over the operations of the rake, both when gathering the hay and dumping the same, as well as when going to and from fields, and whether the animal is a slow or fast walker the driver can by this operation of the levers make a clear and positive dump without dragging the hay.

Having described my invention, what I claim is—

1. In a horse hay-rake, the combination, with a revolving axle, a draft-frame, and a rake-head, of a bracket connecting said rake-head loosely with said revolving axle and having a friction-wheel connected with it, a friction-strap having one end secured to the draft-frame with its body around the friction-wheel and its opposite end secured to a lever pivoted to said draft-frame, substantially as and for the purposes set forth.

2. In a horse hay-rake, the combination, with the friction-wheel and bracket mounted loosely on a revolving axle and coupling the rake-head with said friction-wheel, of a friction-strap coacting with said friction-wheel and having one end fixed permanently to the draft-frame and its opposite end with a lever pivoted to said frame, substantially as and for the purposes set forth.

3. In a horse hay-rake, the combination, with a revolving axle having a ratchet-wheel secured therewith, a bell-crank lever pivoted to the rake-head and carrying a pivoted pawl which coacts with said bell-crank lever, of a friction-wheel loosely mounted on the revolving axle and connected with the rake-head, a friction-strap connected with the draft-frame at one of its ends, and a lever pivoted to said frame and to the opposite end of said friction-strap, substantially as and for the purposes set forth.

WILLIAM J. RISEDORPH.

Witnesses:
 HENRY SCHLINGLOFF,
 WILLIAM F. SELKIRK.